April 20, 1937.  C. H. WILSON ET AL  2,077,451
METHOD AND APPARATUS FOR CONTROLLING THE ACTUATION OF RECORDERS
Original Filed Dec. 14, 1928   2 Sheets-Sheet 1
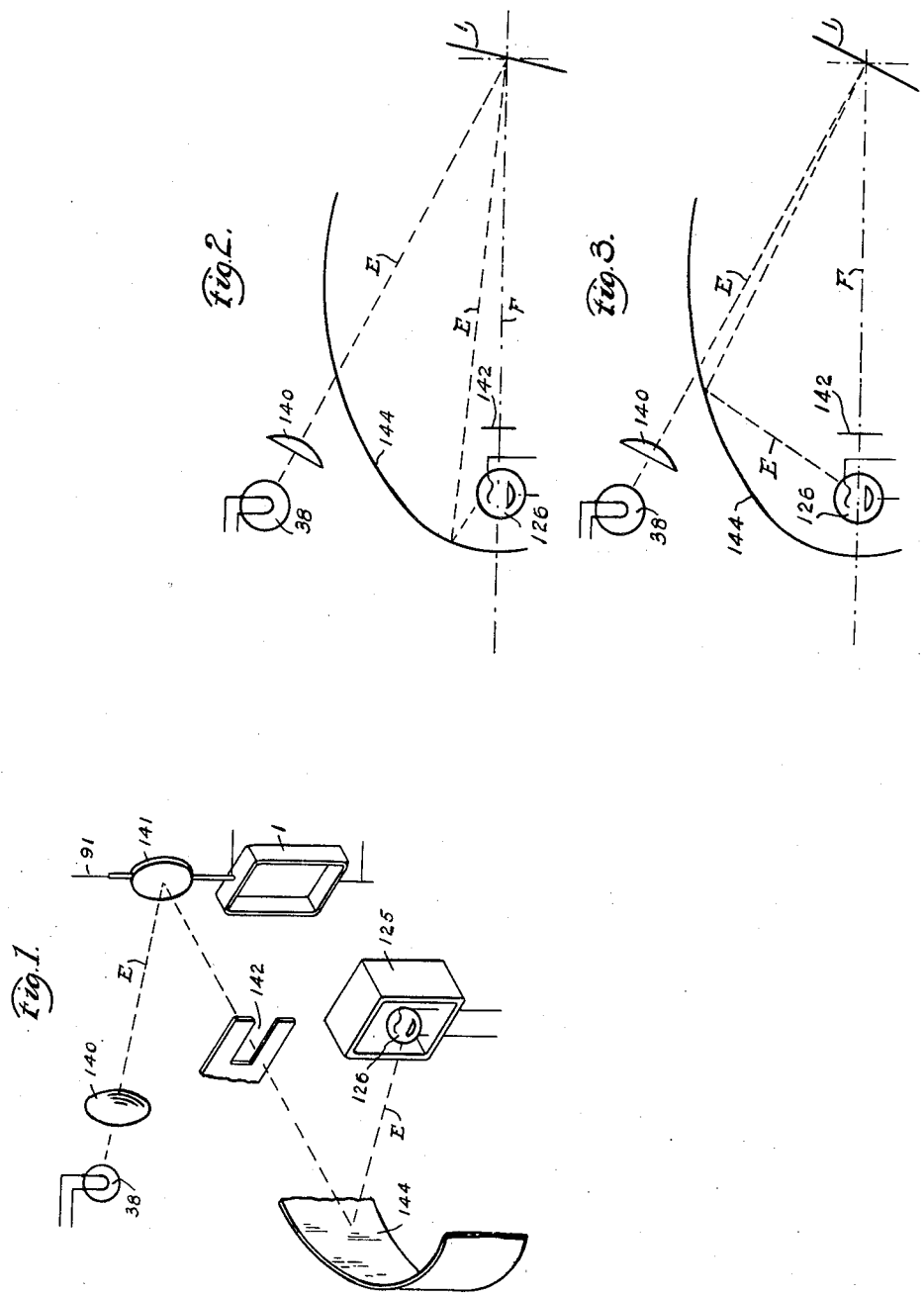
INVENTORS;
Charles H. Wilson,
Cuthbert J. Brown.
By Harold D. Penney
ATTORNEY.

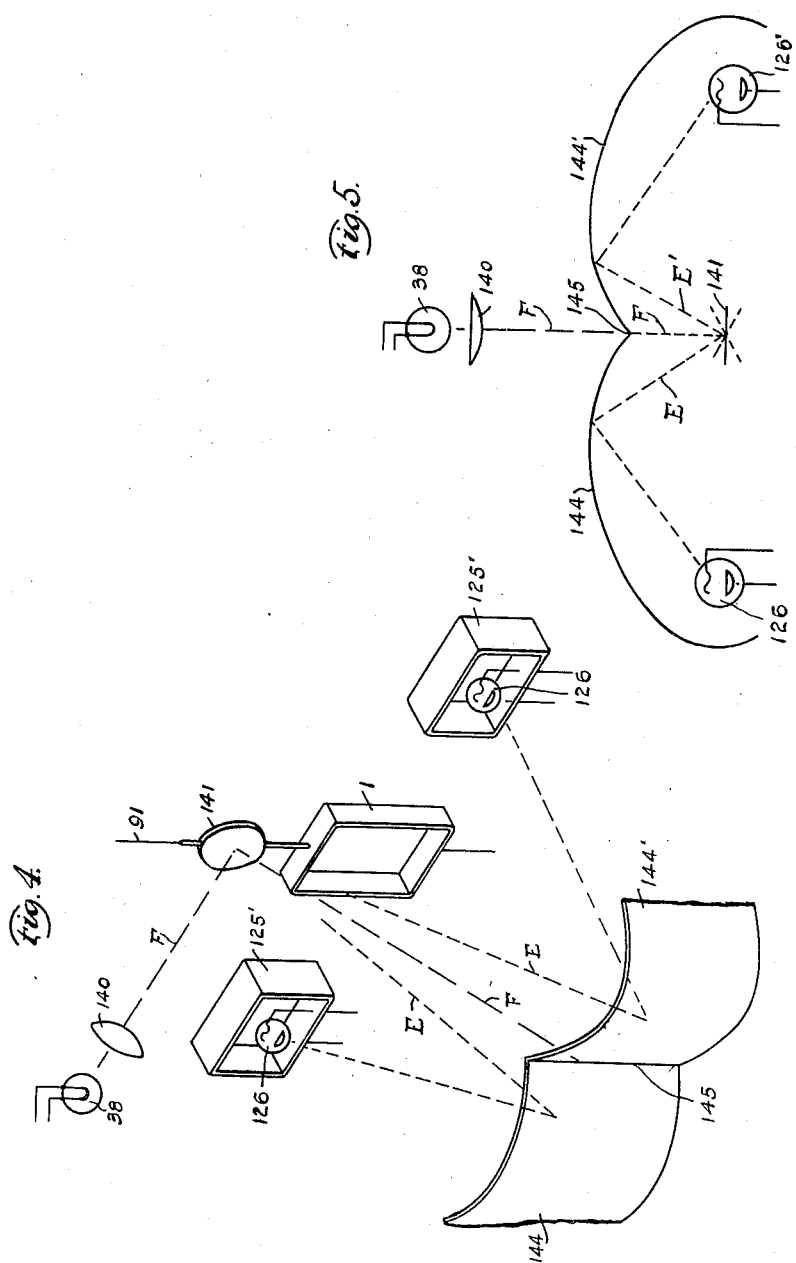

Patented Apr. 20, 1937

2,077,451

UNITED STATES PATENT OFFICE 2,077,451

METHOD AND APPARATUS FOR CONTROLLING THE ACTUATION OF RECORDERS

Charles H. Wilson, Pelham, N. Y., and Cuthbert J. Brown, Foxboro, Mass., assignors to The Foxboro Company, Foxboro, Mass., a corporation of Massachusetts Original application December 14, 1928, Serial No. 326,074, now Patent No. 1,930,496, dated October 17, 1933. Divided and this application September 30, 1933, Serial No. 691,585

15 Claims. (Cl. 250—41.5)

Our present invention relates to an improvement in method and apparatus for utilizing light-actuated means for causing controlled actuation of recorders, recording chronographs, autograph recorders, repeaters, pyrometer controls of the automatic furnace-temperature control type, and similar instruments of the above noted class, wherein various kinds of records and analyses are made, to which such appliances may be directed.

The invention relates more particularly to matter divided from our U. S. Patent application Serial No. 326,074, filed December 14, 1928, for Temperature controller recorder including method and apparatus, which application was issued on October 17, 1933, into Patent No. 1,930,496.

In said patent the present invention was shown as adapted to control temperature recording apparatus as utilized in conjunction with an automatic temperature controlling system of novel design, primarily adapted to control the temperatures of industrial furnaces. In this particular system of the patent, the predetermined temperature desired is set by manually controlled means which are related to control contacts in such system, and by means of a furnace thermocouple in control of a galvanometer, operating under the so-called null method, the deflections of the thermocouple influenced galvanometer, which delicate element is freed of all mechanical incumbrance, affect the system to maintain furnace temperatures within desired limits, as described in said patent.

In said patent, there are shown a fixed source of light and light-actuated, current-passing means in a control circuit, such light-actuated means being in either the form of the well known selenium cell or its improved equivalent, the photoelectric cell, whereby a galvanometer, operating under the influence of currents generated by a furnace heated thermocouple of any suitable type, and carrying a light reflecting means or a light intercepting means, causes initiating control operation, and cycle, of a series of associate circuits and mechanism whereby to regulate furnace temperatures, whether the source of furnace heat be oil or gas fuel, electric or steam, and regardless of the kind of mechanical means involved to control the heat sources.

In said patent are shown various means controlled by the galvanometer for controlling said light, whereby said galvanometer is relieved of all unnecessary load in its performance of intermittent control of the operation of associate devices and which, in its present adaptation, is utilized only to cut off or expose or deflect a beam of light to the light sensitive means. Thus, the galvanometer is subjected to no restraint whatever, except as to predetermined limitation of its amplitude of oscillation by stops provided for this purpose.

An object of the invention is to provide an arrangement whereby light reflected from the galvanometer or other mirror may be projected upon the photoelectric cell at all angles of deflection of the mirror within desired predetermined limits, thus allowing the light effect on the cell to be utilized for a larger angle of deflection of the mirror than heretofore.

Another object is to provide arrangements of the above kind adapted for use in systems similar to Fig. 4 of said patent, and arrangements suitable for use with the two-cell systems shown in Figs. 1 and 2 of the patent. Other objects will appear as the description proceeds.

In the accompanying drawings,

Fig. 1 is diagrammatic view of a galvanometer control mechanism suitable for the system shown in Fig. 4 of said patent, showing a galvanometer actuated reflector used with a secondary curvilinear reflector of fixed type.

Figs. 2 and 3 are diagrammatic plan views illustrating the range of the light rays in the form shown in Fig. 1 during operative periods.

Fig. 4 is a diagrammatic view of a galvanometer having optical means associated therewith to actuate dual photoelectric cell control arrangement, which is adapted, as an alternative embodiment, to be used in the systems shown in Figs. 1 and 2 of said patent, showing a light reflecting means rigidly mounted on a suspended or pivoted movable galvanometer and used with a fixed double curvilinear reflector, with a single source of light and light concentration, in which the galvanometer, and its reflector are the only moving parts.

Fig. 5 is a plan view of the means shown in Fig. 4, disclosing diagrammatically the action of the light rays and range of action thereof.

In Figs. 1 to 4 of the drawings, there is shown a form of control mechanism suitable for use in place of the shutter system shown in Fig. 4 of said patent.

In this form of the invention, light beams E from the light source 38 are concentrated by a lens 140 on a mirror 141, carried by the galvanometer 1. The beams are then reflected onto a fixed, curvilinear, mirror surface 144, said mirror having the form of a right section of a hollow elliptical cylinder. In this case, the inner surface is the reflecting surface.

The beams are reflected from galvanometer mirror 141 to the photoelectric cell 126, housed in a box 125, through reflection from mirror 141. To provide a cut-off point for the light beams E, a light cut-off stop or diaphragm 142 is interposed between the mirrors 141 and 144. The stop 142 may also be placed between the cell 126 and mirror 144. A portion of the mirror 144 may be left unsilvered and the beams thus absorbed on this surface on mirror 144.

The mirror 144, geometrically, is a section of a hollow, right, elliptical cylinder. The galvanometer coil 1 and cell 126 are so arranged that the axis of the coil 1 and the sensitive plate of the cell 126 are each located on a line F, said line passing through one of the foci of the ellipses forming the top and bottom boundaries of the elliptical mirror 144.

Since from the law of the ellipse, the tangent and normal to an ellipse bisect, respectively, the external and internal angles formed by the focal radii at the point of contact, it is evident that light beams, reflected from the galvanometer carried mirror 141, will be projected onto the cell 126, no matter what angle the mirror 141 may assume. Thus, as shown in Figs. 2 and 3, this feature allows for a larger amplitude of deflection of the coil 1, the utilization of which is limited only by the opening in the interposed light stop 142.

Fig. 4 shows an optical arrangement to be applied to a system as shown in Figs. 1, 2, and 3 of said patent, including temperature control and recording, the arrangement here shown being used to replace the shutter mechanism in Figs. 1 and 2 of the patent, and the mirror structure in Fig. 3 of the patent.

The coil 1, of the galvanometer, carries a fixed mirror 141, as explained in Figs. 1 to 3 inclusive, which reflects a beam F onto a compound elliptical mirror 144—144'. The arrangement shown in Fig. 4 is similar to that in Fig. 5, but the cells and mirror are duplicated. Two cells 126—126 encased in housings 125', 125' receive the angularly reflected beam F from the single light source 38, through condenser lens 140 to the galvanometer mirror 141 and thence to either elliptical mirror surfaces 144, 144'.

The light beams F from source 38 are concentrated by a lens 140 on the mirror 141. When the coil 1 is in rest or zero position the beam F strikes the mirror 141 and is reflected to the intersection 145 of the two surfaces 144, 144'. An unsilvered strip may be left at this point for the light beams to be absorbed, or a diaphragm may be interposed in front of said intersection, or the light beams may be passed through a slot at this point, not shown. It is understood, of course, that instead of a compound mirror, separate mirrors, shaped as shown, may be substituted.

The two mirror surfaces 144, 144' are so located that the foci all lie on the same straight line and two of the foci, one for each ellipse, are coincidental. The concave faces of both mirrors are toward mirror 141, as shown in the plan view, Fig. 5, and the pivotal axis of the galvanometer 1 passes through this coincidental foci point. The shielded cells 126, 126 are positioned on either side of the mirror 141, as shown.

The operation is obvious. The deflection of the coil 1 in either direction casts a beam E or E' upon the mirror surfaces 144 or 144' and, being reflected, thus activate either of cells 126—126 to control the systems of Figs. 1 to 3 of the patent.

The concaved reflecting surface of the curved mirrors is positioned to receive light of the source, from the galvanometer mirror, and reflect it onto the cell, the concavity and position of said surface being such relative to said mirror and cell as to result in the multiple functions, as follows:

(1) Different positions of said coil may cause an increased amount of concentrated light to fall fully on said cell or leave the cell entirely.

(2) Light of the source remains constantly on said cell throughout a wide angle of the coil during strong impulses to the coil, thereby (3) To cause energization of the cell over a greater range of movement of the galvanometer, (4) To concentrate the light on the cell, (5) Thereby to cause an increased amount of light to reach the cell at the same time, thereby (6) To magnify the effect of impulses to the coil.

(7) To change suddenly from no impulse of the cell to a long impulse of the cell as a result of strong instantaneous electric impulse to said coil.

A further advantage of the diaphragm 142 is that the sharpness of the light cut-off may be controlled by it.

It should be understood that our invention is not limited to the specific details illustrated or to the specific arrangement thereof, since various modifications may be made therein within the spirit of the invention and the scope of the appended claims.

We claim as our invention:

1. A light-responsive control comprising a source of light; a photo-electric cell adapted to be activated by said light; a mirror adapted to be deflected; a lens associated with said source to concentrate light therefrom on said mirror; a second reflecting surface of elliptical shape adapted to receive light reflected from said mirror and reflect it on said cell; and a light cut-off diaphragm between the mirror and said surface so positioned relative to said cell that a slight deflection of said coil from neutral position will affect the said cell.

2. A photoelectric control comprising in combination a beam of light, a plurality of light sensitive devices, means to move said beam of light about a point, a plurality of intersecting elliptical light reflecting surfaces, so arranged that corresponding foci at one end of the respective surfaces are coincident and corresponding foci at the other end of the respective surfaces are spaced, said beam being movable across said surfaces about said coincident foci, and said light sensitive devices being respectively positioned at the spaced foci whereby said beam in passing from one surface to the other immediately leaves one light sensitive device and falls on the other light sensitive device.

3. A photoelectric control comprising, in combination, a beam of light, a plurality of light sensitive devices, means to move said beam of light about an axis, a plurality of light reflecting surfaces comprising sections from elliptical cylinders, said surfaces being arranged side by side with one set of their foci coincident and the other set spaced, said light sensitive devices being respectively located at the spaced foci and the axis about which the beam is movable being coincident with the other foci.

4. An electrical control comprising in combination, a beam of radiant energy, a plurality of devices capable of being affected by said beam, means to move said beam about an axis, a plurality of elliptical reflecting surfaces so arranged that corresponding foci at one end of the respective surfaces are coincident and corresponding foci at the other end of the respective surfaces are spaced, said beam being movable across said surfaces about said coincident foci and said devices being respectively positioned at the spaced foci.

5. A light-responsive control apparatus comprising in combination a source of light; a pair of photo-electric cells adapted to be activated by said light; a casing housing each cell and open at one side; a galvanometer coil adapted to be deflected; a reflecting surface operatively associated with said coil; a lens associated with said source to concentrate light therefrom on said surface; and a pair of elliptical reflecting surfaces adapted to receive light reflected from said first surface and reflect it on said cells respectively, said second surfaces being so positioned relative to said open casing side that a slight deflection of said coil from neutral position will throw light on one cell or the other.

6. In a light responsive control apparatus comprising a photocell, a movable beam of light, and a coacting reflecting surface comprising a section of a hollow elliptical cylinder, the photocell being located at the one focus of said elliptical surface and the beam being movable about the other focus.

7. A photoelectric control comprising in combination a beam of light, a light sensitive device, means to move said beam, a concave light reflecting surface having two foci, the normal to any tangent to said surface bisecting the angle formed by lines joining the point of tangency to said foci, said beam being movable about one of said foci and said light sensitive device being located at the other of said foci and screening means for limiting the effective movement of said beam.

8. A light-responsive control comprising in combination a source of light; a photo-electric cell adapted to be activated by said light; a galvanometer having a coil carrying a mirror adapted to be deflected; a lens to concentrate light from said source on said mirror; a reflecting surface of non-uniform concaved shape adapted to receive light reflected from said first mirror and reflect it on said cell; and a light cut-off diaphragm between the mirror and said cell; said diaphragm and surface being so positioned relative to said cell that a sufficient deflection of said mirror from neutral position will cause said diaphragm to limit the effective range of movement of the light.

9. A light-responsive control apparatus comprising in combination a source of light; a photoelectric cell adapted to be activated by said light; a mirror adapted to be deflected; a lens to concentrate light from said source on said mirror; a bent reflecting surface of non-uniform curvature adapted to receive light reflected from said first mirror and reflect it on said cell; and a light cut-off diaphragm between the mirror and said cell; said diaphragm and surface being so positioned relative to said cell that a sufficient deflection of said mirror from neutral position will cause said diaphragm to limit the effective range of movement of the light.

10. A light-responsive control apparatus comprising in combination a plane movable mirror, means for casting a condensed beam of light on said mirror, stop means for limiting the effective range of movement of the beam, and a stationary bent reflector comprising a shell having a constantly varied curve, said shell having its concave side cooperating in facing relation with the photocell and with said mirror, whereby the beam may be reflected in concentrated form on said photocell.

11. In a light-responsive control apparatus comprising a movable mirror having a photocell on each lateral side thereof, said mirror adapted to cast a beam of light forwardly; a reflector having a vertical neutral line in front of the center of said mirror, and lateral arcuate sections leading rearwardly and forwardly from said line.

12. In a light-sensitive control apparatus comprising a movable mirror having a photocell on each lateral side thereof, said mirror adapted to cast a beam of light forwardly therefrom; a forwardly disposed reflector having a neutral line positioned on the vertical central plane of said mirror, and arcuate sections leading laterally from said line, each of said sections having its curve constantly varied.

13. In a light-sensitive control apparatus having a mirror turnable about its vertical axis, and a photocell on each lateral side of said mirror and spaced therefrom, said mirror adapted to cast a beam of light forwardly; a reflector disposed in front of the mirror and having a neutral line parallel with said axis, and lateral arcuate sections having their curves constantly varied, each of said sections having a portion inclining first slightly rearwardly from said line and then acutely forwardly in front of the associated photocell, whereby during turning movement of the mirror to either side the beam may be reflected on one of said photocells, said sections being adapted to concentrate the reflected beam.

14. A light-sensitive control apparatus comprising in combination a mirror which is movable to opposite sides, means for casting a condensed beam of light on said mirror, so that the beam may be projected forwardly, a photocell on each lateral side of said mirror, a bent reflector having a neutral line disposed parallel with the vertical axis of said mirror, said reflector including a pair of lateral sections, each of said sections having its curve constantly varied, there being a portion of each section disposed first rearwardly from said line and then forwardly in front of the associated photocell, whereby during movement of said mirror to either side the beam may be reflected to one of said photocells, said sections being adapted to concentrate the reflected beam.

15. The herein described control apparatus comprising a galvanometer having a plane mirror mounted thereon, means for casting a condensed beam of light on said mirror so that the beam may be projected forwardly, a photocell disposed on each lateral side of said mirror and spaced therefrom, a compound arcuate reflector having an unsilvered or light absorbing line disposed parallel with the vertical axis of said mirror, said reflector including a pair of lateral sections, said sections being alike and each having its curve constantly varied, there being a portion of each section passed slightly rearwardly from said line and then acutely forwardly in front of the associated cell whereby during movement of the mirror from rest position the beam may be reflected on one of said cells, said sections being adapted to cause energization of the cells over an increased range of movement of the galvanometer with its mounting.

CHARLES H. WILSON.
CUTHBERT J. BROWN.